United States Patent
Gutta et al.

(10) Patent No.: US 6,910,037 B2
(45) Date of Patent: Jun. 21, 2005

(54) METHOD AND APPARATUS FOR PROVIDING SEARCH RESULTS IN RESPONSE TO AN INFORMATION SEARCH REQUEST

(75) Inventors: Srinivas Gutta, Yorktown Heights, NY (US); Vasanth Philomin, Hopewell Junction, NY (US); Miroslav Trajkovic, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 507 days.

(21) Appl. No.: 10/093,329

(22) Filed: Mar. 7, 2002

(65) Prior Publication Data

US 2003/0172063 A1 Sep. 11, 2003

(51) Int. Cl.[7] .............................................. G06F 17/30
(52) U.S. Cl. ...................... 707/5; 707/3; 707/7; 707/10
(58) Field of Search ............................... 707/3, 102, 5, 707/6, 2, 7; 715/523, 513

(56) References Cited

U.S. PATENT DOCUMENTS

| | | | |
|---|---|---|---|
| 5,819,258 A | | 10/1998 | Vaithyanathan et al. |
| 5,913,215 A | | 6/1999 | Rubinstein et al. ........... 707/10 |
| 5,924,090 A | | 7/1999 | Krellenstein .................... 707/5 |
| 6,038,561 A | * | 3/2000 | Snyder et al. .................. 707/6 |
| 6,081,805 A | | 6/2000 | Guha ............................. 707/5 |
| 6,182,066 B1 | * | 1/2001 | Marques ........................ 707/5 |
| 6,360,227 B1 | * | 3/2002 | Aggarwal et al. .......... 707/102 |
| 6,418,429 B1 | * | 7/2002 | Borovoy et al. ............... 707/3 |

OTHER PUBLICATIONS

"Centroid–Based Document Classification: Analysis & Experimental Results", Eui–Hong (Sam) Han et al, XP–002264523.

Hanappel et al., "MSEEC—A Multi Search Engine with Multiple Clustering", Managing IT Resources in Organizations, Information Systems and Software Techniques, IRMA International Conference, 1999, pp. 304–312.

* cited by examiner

*Primary Examiner*—Shahid Alam
*Assistant Examiner*—Cam Y Truong (57) ABSTRACT

A system and method is disclosed for taking the results of a search (i.e., electronic documents) using the TFIDF of terms contained in those search result documents to quantify how related the search result documents are to one another, and organizing the search results based on those qualified relations. Using such a system and method, the search result documents can be displayed in such a manner that the relationships between the search result documents is evident to the viewer.

20 Claims, 6 Drawing Sheets

METHOD AND APPARATUS FOR PROVIDING SEARCH RESULTS IN RESPONSE TO AN INFORMATION SEARCH REQUEST

BACKGROUND OF THE INVENTION

1. Field of the Invention

The present invention relates to the searching of electronic documents and more particularly to a system and method of processing search results in order to determine the relationships between the electronic documents in the search results.

2. Description of Related Art

A popular use of Internet-enabled computing devices (such as personal computers (PCs), personal digital assistants (PDAs), cellular telephones, etc.) is the performance of "web searches." Typically, a user runs a web browser program on the computing device and uses the web browser to access a search engine at a remote server over the Internet. The user interface for the search engine is often a web page with text boxes in which the user may enter a keyword or series of keywords. Once these keywords are entered, the search engine prepares a list of web pages related to those keywords. Usually, the search engine does not actually search the Internet, but searches an index database, in which is maintained files corresponding to web pages on the Internet. In some cases, the index database consists of actual web pages, or compressed versions of web pages.

Figure 1:
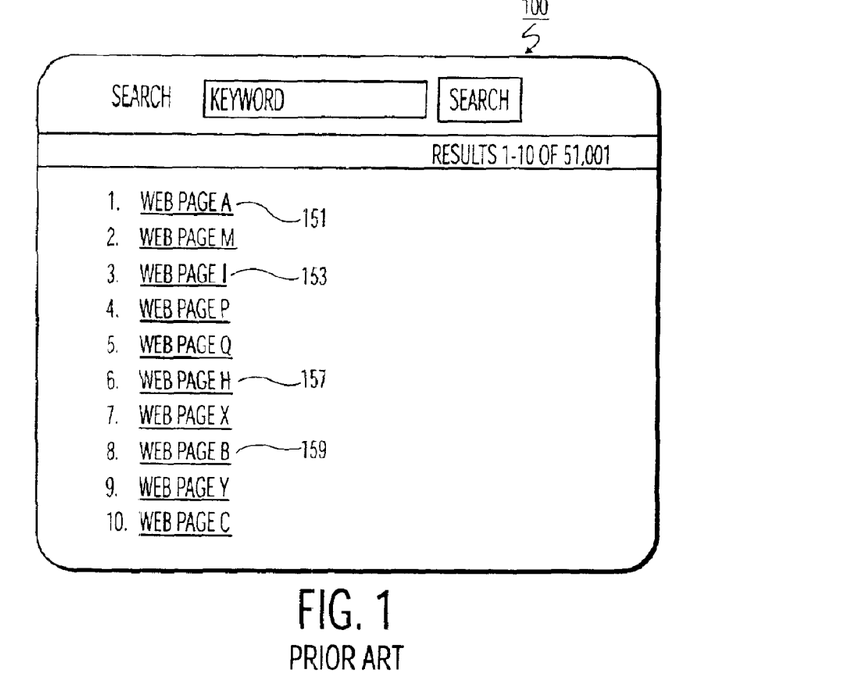
FIG. 1 shows a conventional web page user interface for a search engine showing the results of a search.

Once the list of relevant web pages has been generated, the user interface for the search engine presents the list to the user. FIG. 1 shows a typical web page user interface 100 for displaying search engine results. In FIG. 1, the results are presented as "links" 150, a form of hypertext that allows the user to jump directly to another web page when the user selects ("clicks" or "double-clicks") the link with the cursor of the computing device. Links 150 are typically in order of decreasing relevance, with web page A 151 being the most relevant web page.

However, links that are the most strongly related to each other often appear at separate spots in the list of relevant documents. For example, web page A 151 and web page B 159 may in fact be from the same website. But, because they appear separately on the list, the user may be misled into thinking they are unrelated (except by the search keyword, of course). In addition, because they appear separately and there is a limited amount of display space on the computing device, other relevant web pages are crowded off of the display space and, thus, are not shown to the user. Furthermore, web pages that are strongly related to the same concept, such as web page H 157 and web page I 153, may be separated from each other, although it would be more effective and convenient for the user if web page H 157 and web page I 153 were shown grouped together.

Therefore, there is a need for a system and method which displays search results so that items that are strongly related to each other are grouped together, both to avoid repetition and to provide more information to the viewer.

SUMMARY OF THE INVENTION

One object of the present invention is to avoid repetition of similar items in a list of search results.

Another object of the present invention is to group together strongly related items in the results of a search query so that the viewer can see what items between items in the search result list.

Yet another object of the present invention is to group together strongly related items in the display of search results in a computing device so that the viewer can see which items are interconnected in the search result list and so that the viewer may see more search results.

These and other objects are accomplished by the present invention which provides a system and method for taking the results of a search (i.e., electronic documents), using the TFIDF of terms contained in those search result documents to quantify how related the search result documents are to one another, and organizing the search results based on those quantified relations. Using such a system and method, the search result documents can be displayed in such a manner that the relationships between the search result documents is evident to the viewer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals delineate similar elements.

DETAILED DESCRIPTION OF THE PRESENTLY PREFERRED EMBODIMENTS

Figure 2:
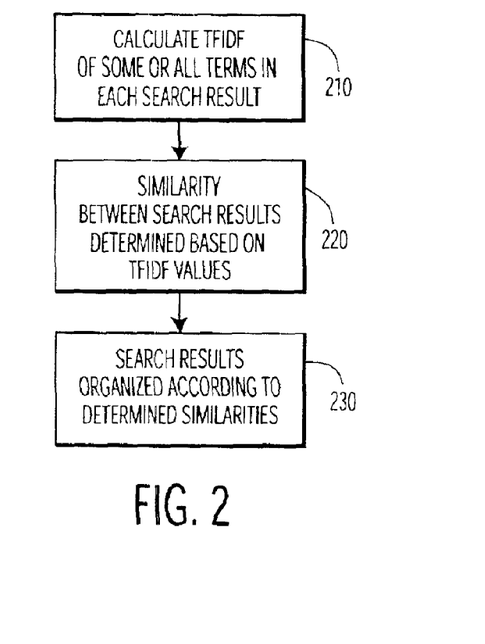
FIG. 2 is a flowchart showing the general outline of steps in the preferred embodiment of the present invention.

The general outline of the steps in the preferred embodiment of the present invention is shown in the flowchart of FIG. 2. Because this is a system and method for processing search item results and not a system and method for performing searches, the steps of performing the search are not shown in FIG. 2. Any possible method of generating search results can be used with the present invention. In step 210 of FIG. 2, the TFIDF (Term Frequency/Inverse Document Frequency) of some or all terms in each search result item is calculated. The definition of TFIDF is given below. Next, in step 220, the similarity based on TFIDF values between search result items is determined. Finally, in step 230, the search result items are organized according to the determined similarities of step 220.

Herein, the term "electronic documents" (or sometimes "documents") will be used for the search result items. Electronic documents are any type of file stored in electronic format and capable of being "read" by an electronic device. Because an electronic document may be a photograph or an audio track, "reading" in this context means the electronic device transforms the material in the electronic document into a format capable of perception by a human. The "terms" of an electronic document are individual bits of data that are capable of being parsed out of an electronic document by an electronic device.

For example, in the Background, the electronic documents are web pages, or, more precisely, HTML (HyperText Markup Language) files. HTML involves "hypertext", which is much more than mere text, and provides for links to other web pages, as well as pointers to other resources. HTML is a "markup" language because it describes how documents are to be formatted. In other words, it tells the web browser what to display and how to display it. Although all web pages are written in a version of HTML (or other similar markup languages), the user never sees the HTML, but only the results of the HTML instructions. For example, the HTML in a web page may instruct the web browser to retrieve a particular photograph stored at a particular location, and show the photograph in the lower left-hand corner of the web page. The user, on the other hand, only sees the photograph in the lower left-hand corner. HTML instructions are in the form of "tags", such as<body bgcolor="t#ffffff">. For the present invention, the "terms" of an HTML electronic document would include both the words of text which appear on the web page, the HTML tags, and all of the elements within the HTML tags.

Furthermore, the present invention applies to any collection of electronic documents, whether, for example, they are web pages in the index database of an Internet search engine, audio files in an MP3 player, or records in a database attached to the computing device of the user.

TFIDF (Term Frequency/Inverse Document Frequency) is the ratio of how many times a term appears in a particular electronic document to how many electronic documents in the global set of documents have that particular term in them. The denominator (Document Frequency: DF) could also be how many times the particular term appears in the global set of documents. Either way, the function of the denominator (DF) is to indicate how well that term will help distinguish between documents in the global set. For example, if a particular term, such as "antidisestablishmentarianism", only appears in three documents, its DF will equal 3. Another term, such as "the", may appear in 300,000 documents, so its DF is 300,000. Thus, because DF is the denominator of TFIDF, the TFIDF of "antidisestablishmentarianism" would be much larger than the TFIDF of "the". In this way, the TFIDF is helpful in selecting those terms that are the most helpful in distinguishing between documents.

The mathematical definition of TFIDF for a word $w_i$ in document x is:

$$TFIDF_x(w_i) = \frac{f_t^x(w_i)}{f_d(w_i)}$$

where:

$f_1^x(w_1)$=TF—the frequency of word $w_i$ in document x $f_d(w_i)$=DF—the document frequency of word $w_i$ over the global set The global set of documents can be changed according to the needs of the particular embodiment.

Figure 3:
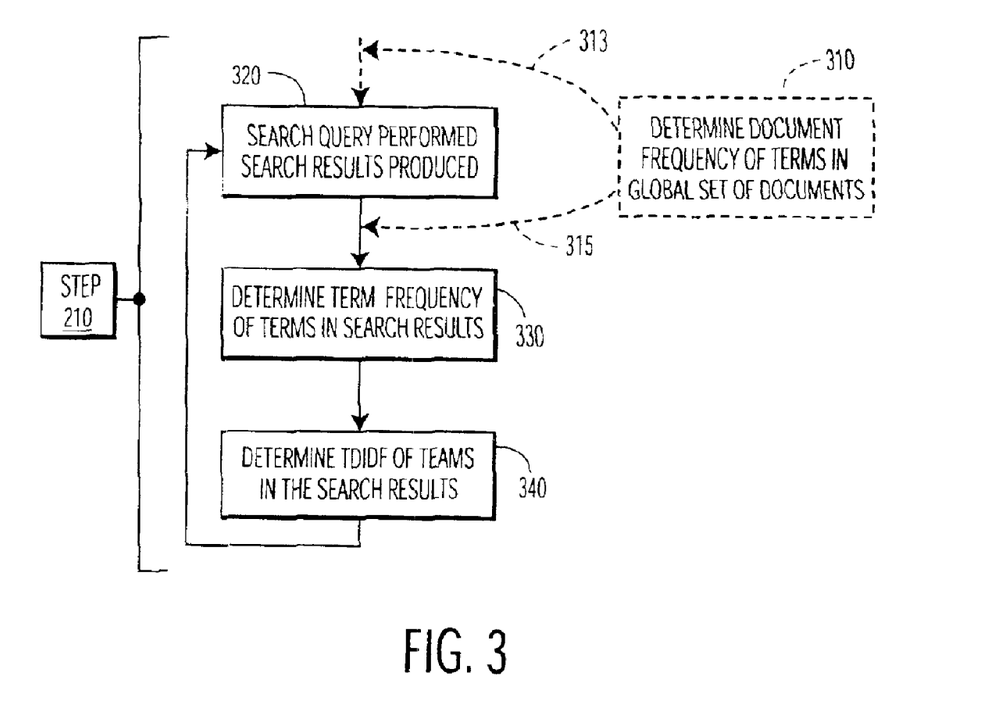
FIG. 3 is a flowchart showing an exemplary method for performing step 210 of FIG. 2 according to an embodiment of the present invention.

Step 210 in FIG. 2 can be further broken down, as shown in FIG. 3. In step 310 (which appears in a box consisting of dashed lines, with dashed lines pointing to two possible positions of the step in the method, which will be explained below), the global frequency $f_d$ of individual words or terms is determined:

Step 310 $DF_G(w_i)=f_d(w_i)$=number of documents in which term $w_i$ appears in set G of documents Dotted line 313 shows the position of step 310 when the global frequencies $f_d$s are predetermined quantities. In this case, step 310 may be performed only once when initializing the system, regardless of how many times the remaining steps are performed. There is a great deal of latitude in determining what will serve as global set G of documents. For example, if working with an Internet search engine, the global set G could be the set of index documents in the index database. The $DF_G$ for every word and/or term in every web page would be calculated, and those DF values would be stored for later usage. This calculation could take place before any particular search is performed. As another example, a dictionary of statistical probabilities could be used, where each term in the dictionary would have an associated probability of appearing in any single document in global set G. If global set G is the Internet, the dictionary could be based on statistical sampling of web pages. If global set G is a medical text database, the dictionary could be an accurate total number of documents having the word $w_i$ in the medical text database. These values could be constantly updated (i.e., step 310 may be repeated) as the contents change.

Dotted line 315 shows the position of step 310 when the global frequencies $f_d$s are determined using the actual search results as the global set G of documents. In other words, after a particular search query has been performed and search results have been produced (i.e., step 320), the documents in the search results would be used to calculate the global frequencies $f_d$s of terms in those documents.

Regardless of whether the global frequencies are determined before or after the search, the next step in FIG. 3 is step 330, where the term frequency of each word in each search result document is calculated. It is assumed that there are N number of documents in the search results. Thus, the term frequency $f_t$ of each word $w_x$ in each of N documents is calculated:

Step 330 $TF_k(w_i)=f_1^k(w_i)$=number of times term $w_i$ appears in document k where k=1, 2, . . . , N In other embodiments, this value may be normalized by dividing the quantity by the number of words in the document. After step 330, the TFIDF of each word $w_i$ in each of N documents is calculated:

Step 340

$$TFIDF_k(w_i) = \frac{f_t^k(w_i)}{f_d(w_i)} \text{ where } k = 1,2,\ldots,N$$

After step 340, it is not necessarily true that each word in each document will have a TFIDF value. For example, if the global frequency $f_d$ of individual terms was calculated beforehand (i.e., if step 310 was before step 320) by using a representative sampling of a search engine's index database of web pages, there is the possibility that certain words in individual search result documents were never given a global frequency $f_d$. As another example, this could happen when the global frequency $f_d$ of individual terms is being downloaded from a dictionary that relates words to statistical probabilities of those words appearing in the English language. In those cases, the words without $f_d$s in the search result documents could be ignored or the global frequencies $f_d$s could be calculated using the search results as the global set. In other embodiments, where the $f_d$ for those words could be calculated using the set of search result documents as the global set of documents (i.e., where step 310 is after step 320), words which appeared in all, or almost all, of the documents may be discarded as having little distinguishing capability.

Figure 4:
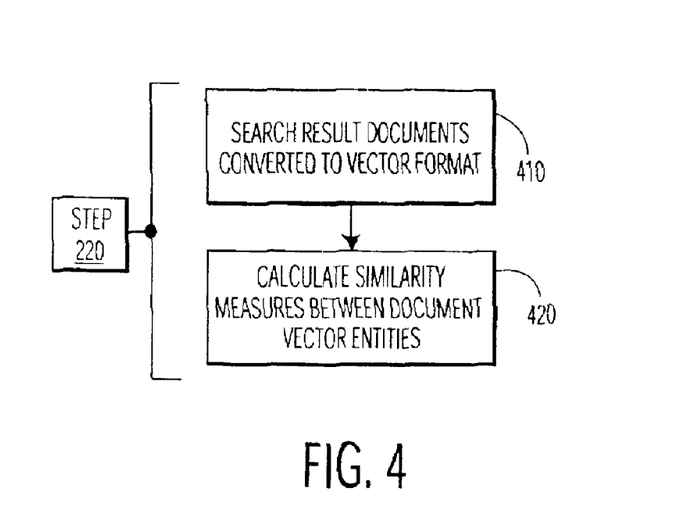
FIG. 4 is a flowchart showing an exemplary method for performing step 220 of FIG. 2 according to an embodiment of the present invention.

Returning to FIG. 2, after calculating the TFIDFs of some or all of the words in the search result documents in step 210, the similarity between search result items is determined based on TFIDF values in step 220. In a preferred embodiment of the present invention, step 220 comprises two steps, as shown in FIG. 4. In step 410 in FIG. 4, the search result documents are converted into vector format; in step 420, the vector entities created in step 410 are used to calculate the similarity measures between the corresponding documents.

Figure 5:
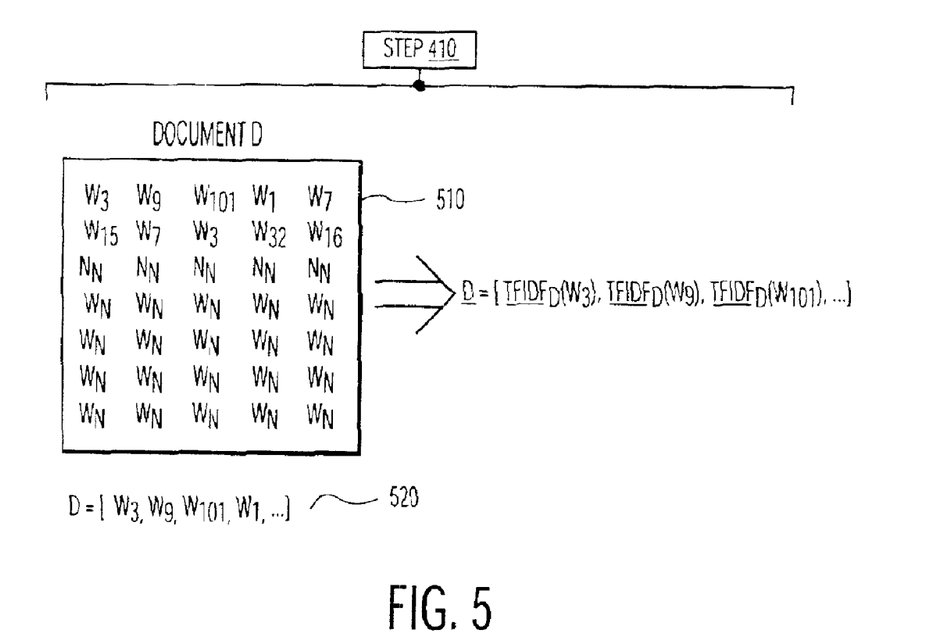
FIG. 5 is a conceptual illustration of the conversion process of step 410 in FIG. 4 according to a preferred embodiment of the present invention.

FIG. 5 is a conceptual illustration of the conversion process of step 410 in FIG. 4. Document D 510 is comprised of words $w_1, w_3, w_7, w_{15}, w_{16}$, etc. in a particular order. This may also be represented as set D 520. When converted into vector format, the words are replaced by the TFIDF vectors for each word, thus resulting in vector entity $\underline{D}$. Once each document is in vector format in step 410, the similarity (e.g., the vector distances) between documents can be measured in step 420.

Figure 6:
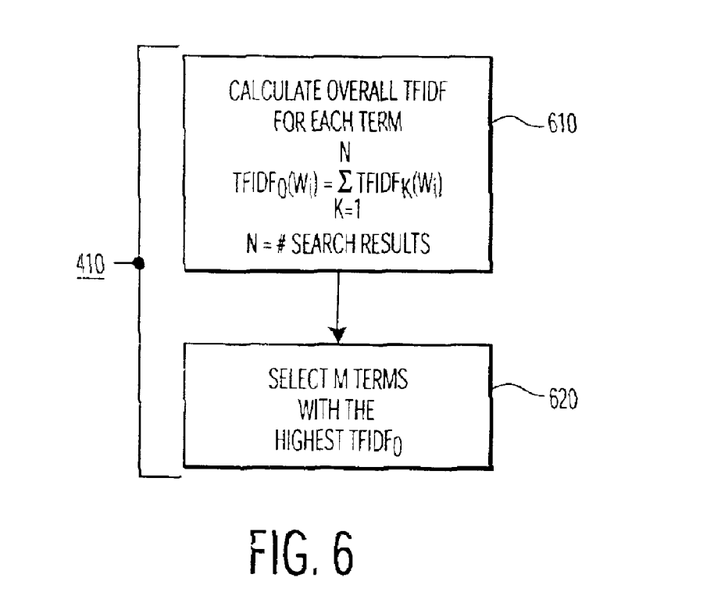
FIG. 6 is a flowchart showing an exemplary method for reducing the number of words which will become vectors in the conversion process of step 410 in FIG. 4 according to a preferred embodiment of the present invention.

In some cases, it may be desirable to convert only certain words in the documents into TFIDF vector format in step 410, rather than all the words. This reduction of vectors will result in less storage and less computation when the documents are compared later. However, it must be determined which words will be converted and which words will not. FIG. 6 is an exemplary method for reducing the number of words which will become vectors in conversion step 410 of FIG. 4. In step 610, the overall $TFIDF_0$ (the TFIDF over all search result documents) for each word is calculated:

Step 610

$$TFIDF_o(w_i) = \sum_{k=1}^{N} TFIDF_k(w_i)$$

This equation adds all the TFIDF values for each word $w_i$ over all N search result documents. Next, a predetermined number M of words with the highest $TFIDF_0$ are selected in step 620. M may be any numerical quantity from 1 to N. If M is 1, the similarity measures calculated in step 420 will be based on one word or term. Preferably, M is chosen so that a large number of vectors are compared between documents, but words like "the" and "an" are eliminated from comparison because of their relatively low $TFIDF_0$ values. Other methods of choosing may be used in step 620. For example, a threshold $TFIDF_0$ value could be used to determine which words would be selected. This would mean that the number of selected words would change from search to search, but the level of relatedness would stay constant.

Returning to FIG. 4, there are numerous methods for determining the similarity (i.e., distance) between vector entities in step 420. Some similarity measures which are well-known in the art include, for example, the Dice coefficient and the Cosine coefficient. The Cosine coefficient represents a dot product between two vectors and measures the angle between the vectors. In the preferred embodiment, the angle is indicative of the relative closeness between two documents with respect to the word to which both vectors correspond. For example, the word "Internet" will have a vector in Document D1 and a vector in document D2, and a small angle between these two vectors would indicate that the two vectors and their representative documents D1 and D2 are closely related. Many examples of similarity measures are in *Pattern Classification*, R. O. Duda, P. E. Hart, and D. G. Stork, (John Wiley & Sons, 2000), which is hereby incorporated by reference.

Figures 7, 8:
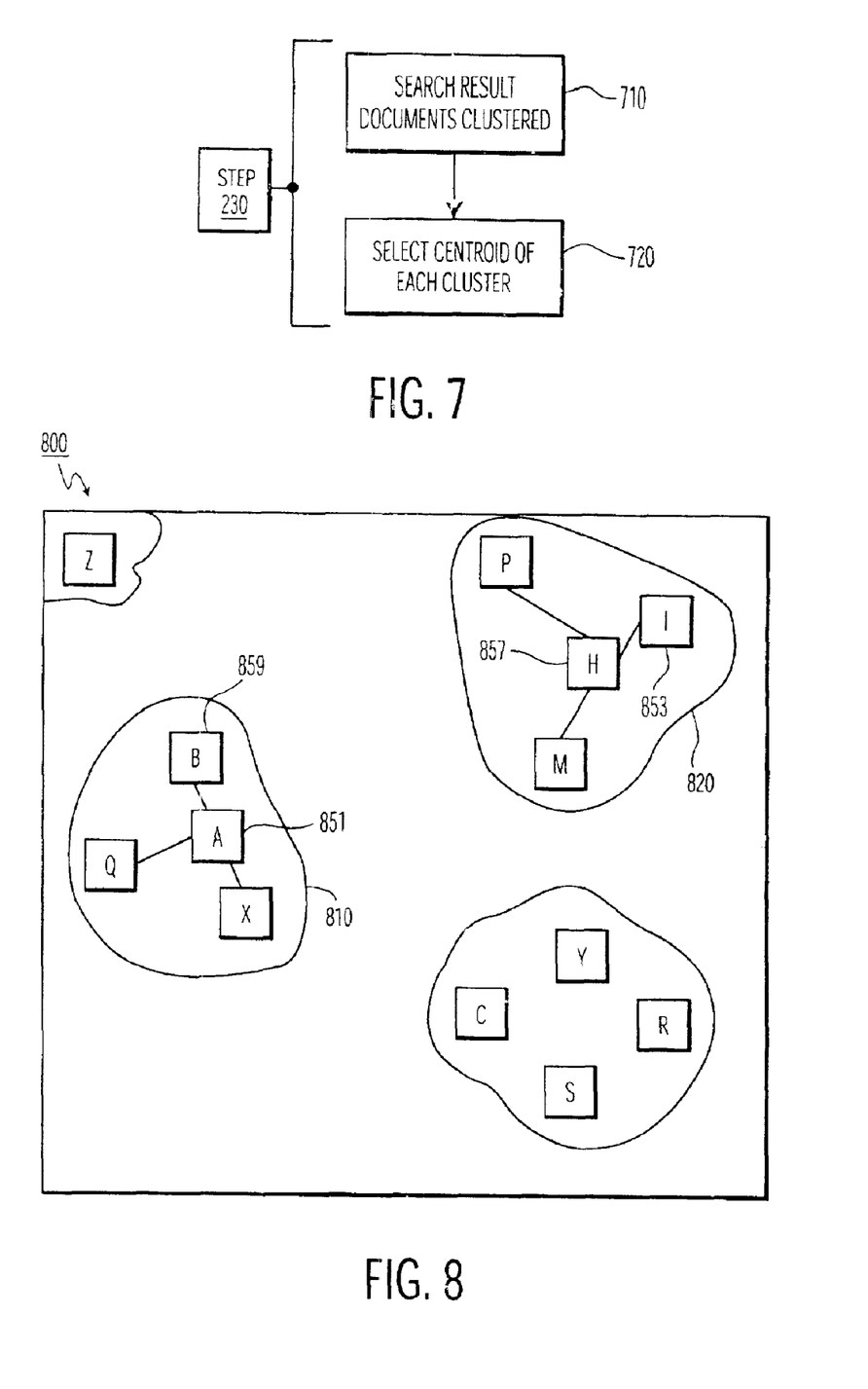
FIG. 7 is a flowchart showing an exemplary method for performing step 230 of FIG. 2 according to an embodiment of the present invention.
FIG. 8 is a conceptual illustration of the organizing process of FIG. 7 according to a preferred embodiment of the present invention.

Returning to FIG. 2, the search result items are organized according to the determined similarities in step 230. In a preferred embodiment of the present invention, step 230 comprises two steps, as shown in FIG. 7. In step 710 in FIG. 7, the search result documents are grouped together, or "clustered", using standard clustering methods on the similarity measures calculated in step 220. This will create clusters of more or less closely related documents. Clustering methods are well-known in the art. The preferred embodiment uses k-step clustering, which is an algorithm for clustering data points into disjoint subsets of data points such that the sum-of-squares criterion is minimized. K-step clustering has the following properties—(a) Each cluster has a center which is the mean position of all the data points in that cluster; and (b) Each data point is in the cluster whose center it is closest to. Many clustering method examples may be found in "Clustering Algorithms", Edie Rasmussen, an article in *Information Retrieval: Data Structures & Algorithms*, William B. Frakes and Ricardo Baeza-Yates (Eds.) (Prentice Hall, 1992), which is hereby incorporated by reference. In step 720, the centroid of each cluster is selected to be the "representative" document of that cluster of documents. Determining the centroid of a cluster of vector entities is also well-known in the art, and examples of centroid calculations may be found in *Pattern Classification*, which was incorporated by reference above.

FIG. 8 is a conceptual illustration of the two-step organizing process of FIG. 7. Box 800 in FIG. 8 is a representation of a section of vector space. Although shown as two-dimensional in FIG. 8, this vector space would be M-dimensional, where M is the number of words that are being compared between documents. Vector entities A 851, B 859, H 857, and I 853 represent different documents. In the two-step process of FIG. 7, the documents that are similar (i.e., the vector entities that are close together in vector space) are first grouped together, as is shown by line 810 enclosing the cluster of A 851, B 859, Q, and X, and line 820 enclosing the cluster of H 957, I 953, P, and M. The determination of what is in a cluster may involve a threshold value (e.g., a maximum distance from the furthest vector entity in the same cluster, a maximum distance from a potential centroid of the cluster, etc.). Second, the centroid of each cluster is determined. In FIG. 8, document A 851 is the centroid of the first cluster, and document H 857 is the centroid of the second cluster. Depending on the number of documents in the search results, it may be possible to have layers of clustering, i.e., sub-clusters within clusters, sub-sub-clusters within sub-clusters, and so on.

FIG. 2 gave a general outline of the method according to the preferred embodiment of the present invention. FIGS. 3–8 and their accompanying description explored specific means of implementing the steps in FIG. 2. Now, FIG. 9 will show a complete sequence of specific exemplary steps for implementing a preferred embodiment of the present invention.

Figure 9:
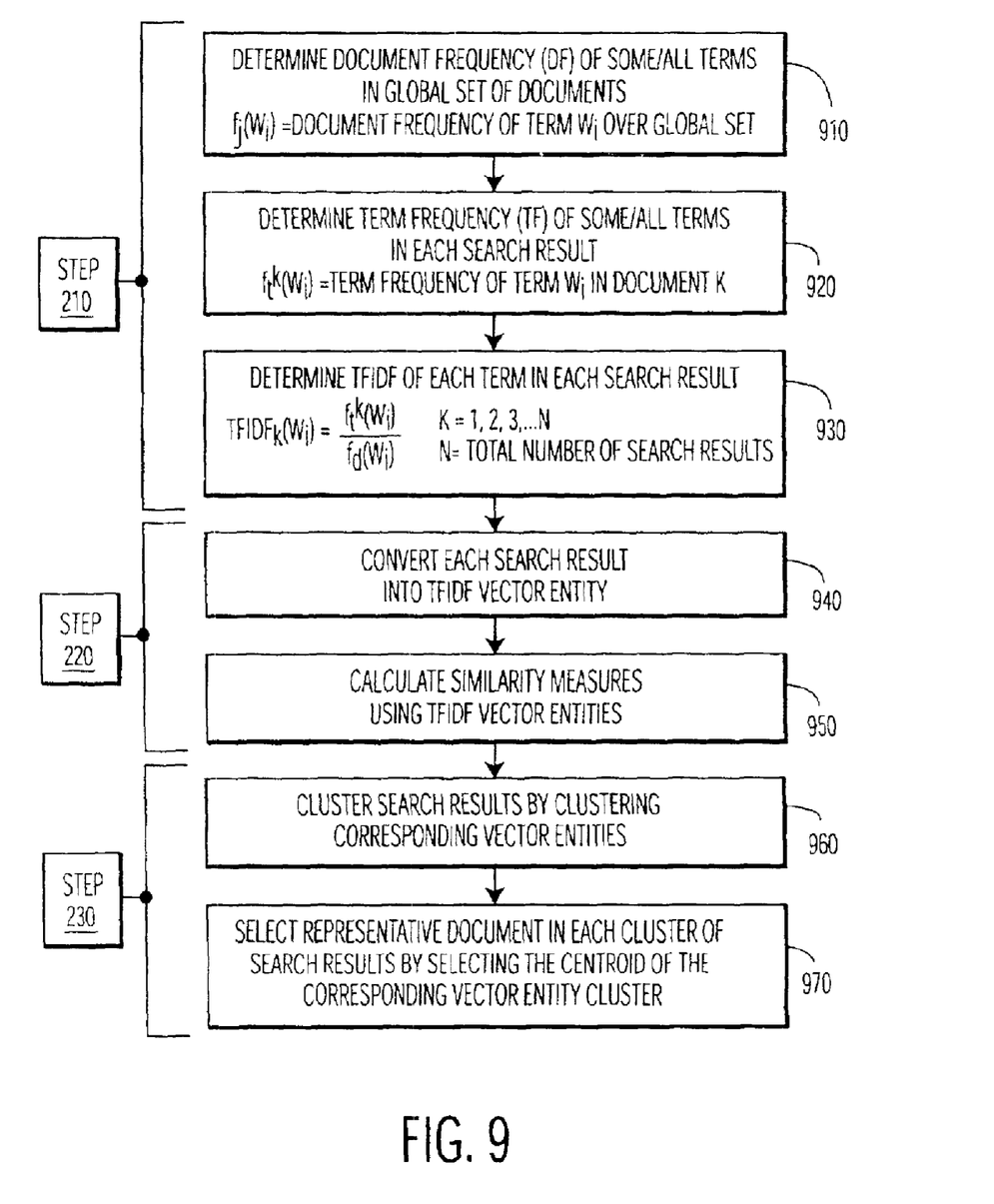
FIG. 9 is a flowchart of an exemplary method for processing search results according to a preferred embodiment of the present invention.

FIG. 9 is a flowchart of an exemplary sequence of steps according to a preferred embodiment of the present invention. In step 910, the document frequency of all or some terms in the global set of documents is determined. This step may take place before or after the particular search is done. After the search is performed and the search results returned, the term frequency of some or all the terms in the electronic documents making up the search results is determined in step 920. It is also possible that step 920 occurs after step 910. Having both the term frequencies from step 920 and the document frequencies of step 910, the TFIDFs of some or all terms in the search result documents are determined in step 930.

Each search result document is converted into a TFIDF vector entity in step 940. Similarity measures between search result documents a re calculated using their corresponding TFIDF vector entities in step 950. Using the similarity measures, the search result documents are grouped together into clusters in step 960 by clustering the corresponding vector entities. Lastly, a representative document is chosen from each cluster by selecting the centroid of the corresponding vector entity cluster in step 970.

Figure 10:
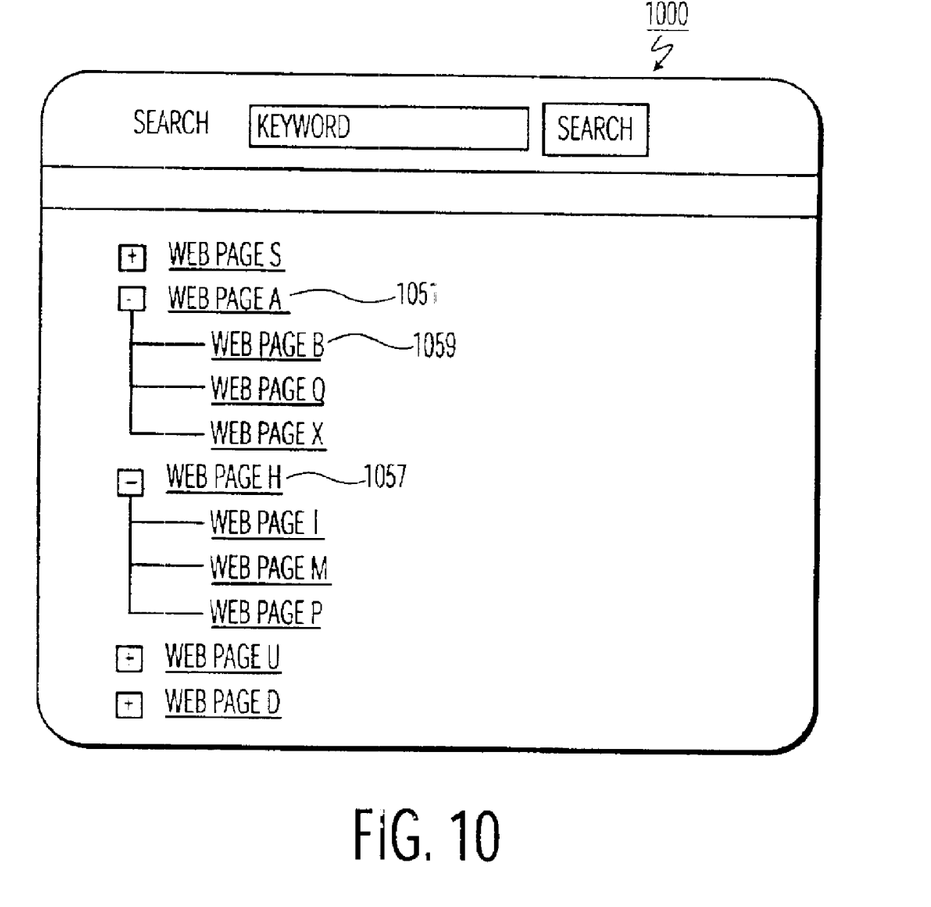
FIG. 10 shows a web page user interface for a search engine showing the results of a search according to a preferred embodiment of the present invention.

FIG. 10 shows an exemplary web page user interface 1000 for displaying search engine results after performing the steps of a method according to a preferred embodiment of the present invention. The links of some of the search results organized in FIG. 8 are displayed in the web page of FIG. 10. The search results are presented in a semi-hierarchical format (only two levels—the centroid and the other documents remaining in the cluster). When the web page opens, the centroids of each cluster are the only links showing. Each centroid has a "+" in a box to its left; when the is clicked on, the second level of links is shown beneath the centroid. In FIG. 10, the "+" boxes next to centroid links A 1051 and H 1057 have been clicked on, so the second layer of documents are shown underneath each centroid link. The second layer of documents are shown in order of decreasing relevance. Thus, under link 1051 for centroid document A 851 is listed link 1059 for document B, the link for document Q, and the link for document X.

In contrast to FIG. 1, the preferred embodiment of the present invention, as shown in FIG. 10, groups together the documents that are strongly related. This will make it much easier for a user to comprehend how the search results break down into related categories. For instance, if a user performs a search with the keyword "mason", the search results may fall into two basic categories: masons and masonry on the one hand, and freemasonry on the other. In the prior art, the results from both categories would be interlaced, making it difficult for the user to narrow his or her focus on a desired category. With the preferred embodiment of the present invention, the user would receive the results already separated into the two categories "mason/masonry" and "freemasonry".

The descriptions of the various preferred embodiments above show some of the advantages of the present invention. By using the TFIDF of terms, the present invention takes into account how effective a term is in distinguishing documents. Organizing the search results into clusters based on the relationships between the search results helps the user to immediately ascertain the connections between documents.

Many of the parameters in the preferred embodiments of the present invention may be set by the user. The user may determine which terms will be used in the method. For example, if the search results were in the form of HTML documents, the user could indicate that only photograph tags were used in the method, thus resulting in the documents being clustered according to their photographs. The user might determine different global sets from which to determine global frequency. For example, if the embodiment of the present invention used predetermined $f_d$ values from one or more dictionaries, the user might select different dictionaries to use depending on the search (i.e., a medical dictionary when most of the search results are medical articles, a law dictionary when the results are legal articles, etc.). The user may also determine the different thresholds which may be used. For example, the user might indicate the size of clusters by determining a maximum distance. As another example, the user might choose the value M for how many vectors will be compared in the similarity measure step. In that way, the user could limit the amount of calculation needed, and receive the results sooner; or increase the amount of calculation, and receive more finely differentiated results. While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for a processor to process results of a search, wherein the search results are electronic documents comprised of terms, the method comprising the steps of:

a) determining a document frequency (DF) of some or all terms in a global set of electronic documents, wherein the document frequency is a frequency of a term over a global set of documents;

b) determining a term frequency (TF) of some or all terms in each document in the search results, wherein the term frequency is a number of times a term appears in a particular electronic document;

c) determining a TFIDF (Term Frequency Inverse Document Frequency) for some or all terms in each particular electronic document in the search results by dividing the TF of step (b) by the DF of step (a);

d) calculating an overall TFIDF for each of the terms for which the TDIDF was determined in step (c), wherein an overall TFIDF for a particular term is a sum of all TFIDFs for that particular item in the electronic documents of the search results;

e) selecting a number M of terms with overall TFIDFs based on their overall TFIDFs, wherein M is less than or equal to the total number of terms with overall TFIDFs;

f) converting each electronic document in the search results into vector format whereby a corresponding vector entity is created for each electronic document, wherein only the determined overall TFIDF values of selected M terms are vectors;

g) calculating similarity measures between the corresponding vector entities of step (f);

h) using the calculated similarity measures to cluster the electronic documents in the search results by clustering their corresponding vector entities, whereby at least one cluster is formed; and i) selecting a representative electronic document for each of the at least one cluster by selecting a centroid vector entity in each cluster.

2. The method of claim 1, wherein the document frequency is one of a number of times the term appears in the global set of electronic documents and a number of electronic documents in the global set of electronic documents in which the term appears.

3. The method of claim 1, wherein step (a) occurs one of before the search is performed and after the search is performed.

4. The method of claim 1, wherein step (a) occurs before the search is performed and wherein the global set of electronic documents is a set of index files in an index database of a search engine.

5. The method of claim 1, wherein step (a) occurs after the search is performed and wherein the DF is retrieved from a dictionary which contains statistical probabilities for terms.

6. The method of claim 1, wherein step (a) occurs after the search is performed and wherein the global set of documents are the search results.

7. The method of claim 1, wherein TFIDFs determined in step (c) are normalized by dividing each determined TFIDF by a length of the particular electronic document.

8. The method of claim 1, wherein step (g) of calculating similarity measures is performed using one of Dice coefficients and Cosine coefficients.

9. The method of claim 1, further comprising the steps of:
j) creating a sub-cluster within at least one cluster of the at least one cluster created in step (h) using the calculated similarity measures; and k) selecting a representative electronic document for the created sub-cluster by selecting a centroid vector entity in the created sub-cluster.

10. The method of claim 1, further comprising the step of: displaying a summary of the search results by showing a hierarchy of electronic documents in the search results, wherein the hierarchy comprises a first level of representative documents and a second level of remaining documents in the clusters.

11. The method of claim 1, wherein step (e) comprises the steps of:
selecting a number M; and
selecting the M terms with highest overall TFIDF values.

12. The method of claim 1, wherein step (e) comprises the steps of:
selecting a minimum overall TFIDF value for a term; and
selecting terms with an overall TFIDF value above the minimum overall value, wherein M is whatever number of terms have an overall TFIDF value above the minimum overall value.

13. A method for a processor to process results of a search, wherein the search results are electronic documents comprised of terms, comprising the steps of:
determining a TFIDF (Term Frequency Inverse Document Frequency) for each term in each electronic document in the search results, wherein the TFIDF is a term frequency divided by a document frequency, wherein the term frequency is a frequency of a particular term in a document and the document frequency is a frequency of the particular term over a global set of documents;

calculating an overall TFIDF for each term, wherein an overall TFIDF for a particular term is a sum of all TFIDFs for that particular item in the electronic documents of the search results;

selecting a number M of terms with overall TFIDFs based on their overall TFIDFs, wherein M is less than or equal to the total number of terms with overall TFIDFs;

converting each electronic document in the search results into vector format whereby a corresponding vector entity is created for each electronic document, wherein only the determined overall TFIDF values of selected M terms are vectors;

determining a similarity measure between the vector entities corresponding to the electronic documents in the search results, whereby said similarity measure is based on the determined overall TFIDF values; and organizing the search results according to the determined similarity measures.

14. The method of claim 13, wherein the document frequency is one of a number of times the particular term appears in the global set of electronic documents or a number of electronic documents in the global set of electronic documents in which the particular term appears.

15. The method of claim 13, wherein the step of determining the TFIDF for each term in each electronic document comprises the steps of:
a) determining one of the number of times a particular term appears in the global set of electronic documents and the number of electronic documents in the global set of electronic documents in which the particular term appears;

b) determining the number of times each term is in a particular electronic document; and c) determining the TFIDF for each term in each particular electronic document in the search results by dividing a result of step (b) by a result of step (a).

16. The method of claim 13, wherein the step of organizing the search results according to the determined similarity measures comprises the steps of:
using the calculated similarity measures to cluster the electronic documents in the search results by clustering their corresponding vector entities, whereby at least one cluster is formed; and selecting a representative electronic document for each of the at least one cluster by selecting a centroid vector entity in each cluster.

17. The method of claim 13, wherein the step of selecting a number M of terms with overall TFIDFs based on their overall TFIDFs comprises the steps of:
selecting a number M; and
selecting the M terms with highest overall TFIDF values.

18. The method of claim 13, wherein the step of selecting a number M of terms with overall TFIDFs based on their overall TFIDFs comprises the steps of:
selecting a minimum overall TFIDF value for a term; and
selecting terms with an overall TFIDF value above the minimum overall value, wherein M is whatever number of terms have an overall TFIDF value above the minimum overall value.

19. A system for a processor to process results of a search, wherein the search results are electronic documents comprised of terms, the system comprising:
means for determining a document frequency (DF) of some or all terms in a global set of electronic documents, wherein the document frequency is a frequency of a term over a global set of documents;

means for determining a term frequency (TF) of some or all terms in each document in the search results, wherein the term frequency is a number of times a term appears in a particular electronic document;

means for determining a TFIDF (Term Frequency Inverse Document Frequency) for some or all terms in each particular electronic document in the search results by dividing a TF of each particular term by a DF of the particular term;

means for calculating an overall TFIDF for each of the terms for which the TDIDF was determined, wherein an overall TFIDF for a particular term is a sum of all TFIDFs for that particular item in the electronic documents of the search results;

means for selecting a number M of terms with overall TFIDFs based on their overall TFIDFs, wherein M is less than or equal to the total number of terms with overall TFIDFs;

means for converting each electronic document in the search results into vector format whereby a corresponding vector entity is created for each electronic document, wherein only the determined overall TFIDF values of selected M terms are vectors;

means for calculating similarity measures between the corresponding vector entities;

means for using the calculated similarity measures to cluster the electronic documents in the search results by clustering their corresponding vector entities, whereby at least one cluster is formed; and means for selecting a representative electronic document for each of the at least one cluster by selecting a centroid vector entity in each cluster.

20. The system of claim 19, wherein the means for selecting a number M of terms with overall TFIDFs based on their overall TFIDFs performs the steps of:

selecting a minimum overall TFIDF value for a term; and selecting terms with an overall TFIDF value above the minimum overall value, wherein M is whatever number of terms have an overall TFIDF value above the minimum overall value.

* * * * *